US009458346B2

(12) United States Patent
Overbeek et al.

(10) Patent No.: US 9,458,346 B2
(45) Date of Patent: Oct. 4, 2016

(54) BIO-RENEWABLE SEQUENTIAL VINYL POLYMER

(75) Inventors: Gerardus Cornelis Overbeek, Waalwijk (NL); Tijs Nabuurs, Waalwijk (NL)

(73) Assignee: DSM IP ASSETS B.V., Heerlen (NL)

( * ) Notice: Subject to any disclaimer, the term of this patent is extended or adjusted under 35 U.S.C. 154(b) by 605 days.

(21) Appl. No.: 13/995,660

(22) PCT Filed: Dec. 20, 2011

(86) PCT No.: PCT/EP2011/073440
§ 371 (c)(1),
(2), (4) Date: Nov. 12, 2013

(87) PCT Pub. No.: WO2012/084974
PCT Pub. Date: Jun. 28, 2012

(65) Prior Publication Data
US 2014/0065435 A1 Mar. 6, 2014

(30) Foreign Application Priority Data
Dec. 20, 2010 (EP) .................... 10195937

(51) Int. Cl.
| C09J 151/06 | (2006.01) |
| C08L 51/06 | (2006.01) |
| C09D 133/06 | (2006.01) |
| C09D 11/106 | (2014.01) |
| C09D 151/06 | (2006.01) |
| C09D 133/12 | (2006.01) |
| C08F 265/06 | (2006.01) |
| C08L 33/12 | (2006.01) |
| C09D 5/02 | (2006.01) |

(52) U.S. Cl.
CPC ........... *C09D 133/06* (2013.01); *C08F 265/06* (2013.01); *C08L 33/12* (2013.01); *C08L 51/06* (2013.01); *C09D 5/02* (2013.01); *C09D 11/106* (2013.01); *C09D 133/12* (2013.01); *C09D 151/06* (2013.01); *C09J 151/06* (2013.01); *C08L 2201/06* (2013.01); *Y10T 428/31692* (2015.04); *Y10T 428/31855* (2015.04); *Y10T 428/31895* (2015.04)

(58) Field of Classification Search
None
See application file for complete search history.

(56) References Cited

U.S. PATENT DOCUMENTS

| 5,859,112 A * | 1/1999 | Overbeek ............ C08F 265/04 523/201 |
| 5,962,571 A * | 10/1999 | Overbeek ................ C08F 8/30 428/460 |
| 2003/0035869 A1 | 2/2003 | Li et al. |
| 2009/0246430 A1 | 10/2009 | Kriegel et al. |

FOREIGN PATENT DOCUMENTS

| EP | 0 387 664 | 9/1990 |
| EP | 0 949 307 | 10/2001 |
| FR | 2 943 351 | 9/2010 |
| WO | WO 95/29944 | 11/1995 |
| WO | WO 95/29963 | 11/1995 |

OTHER PUBLICATIONS

International Search Report for PCT/EP2011/073440 mailed Jan. 25, 2012.
Written Opinion of the International Searching Authority mailed Jan. 25, 2012.

* cited by examiner

*Primary Examiner* — Sheeba Ahmed
(74) *Attorney, Agent, or Firm* — Nixon & Vanderhye P.C.

(57) ABSTRACT

An aqueous polymer dispersion comprising a vinyl polymer with at least two phases comprising: A) 40 to 90 wt % of a vinyl polymer A having a glass transition temperature in the range of from −50 to 30° C.; and B) 10 to 60 wt % of a vinyl polymer B having a glass transition temperature the range of from 50 to 130° C.; wherein vinyl polymer A comprises 0.1 to 10 wt % of at least one acid-functional olefinically unsaturated monomer, wherein at least 20 wt % of the monomer composition used to form vinyl polymer A and vinyl polymer B is derived from at least one bio-renewable olefinically unsaturated monomer.

15 Claims, No Drawings

BIO-RENEWABLE SEQUENTIAL VINYL POLYMER

This application is the U.S. national phase of International Application No. PCT/EP2011/073440 filed 20 Dec. 2011 which designated the U.S. and claims priority to EP 10195937.7 filed 20 Dec. 2010, the entire contents of each of which are hereby incorporated by reference.

The present invention relates to an aqueous sequential vinyl polymer dispersion comprising at least 10% by weight (preferably at least 20 wt % of bio-renewable monomers, to a process for making such a polymer dispersion and its use for coating substrates.

It is an object of the present invention to provide a sequential vinyl polymer dispersion which is preferably obtained from bio-renewable olefinically unsaturated monomers which forms a film at room temperature with preferably no more than small amounts of film formation assistants and whose films possess high flexibility (elasticity) and good resistance to blocking.

Traditional coatings may be unsatisfactory because the polymer films possess little flexibility and the coatings on substrates, such as wood, which are not dimensionally stable; tear and chip off. A disadvantage of hard polymer dispersions is that they can only be processed with the addition of large amounts of film formation assistants that are disadvantageous to initial block resistance.

The initial block resistance is the tendency of the freshly applied coatings which have dried for only a short time to block. This tendency to block makes it virtually impossible, for example, for coated substrates to be stacked rapidly, and is due to the large amounts of film formation assistants which are still present in the binder film and are released only gradually by the conventional polymers at room temperature. When drying is carried out at room temperature, the final block resistance is frequently reached only after several days.

There is also an increasing demand to use bio-renewable monomers in order to improve the sustainability of the polymers used in for example coating applications. In view of concerns about depletion of fossil fuel resources or an increase in carbon dioxide in the air that poses a global-scale environmental problem in recent years, methods for producing raw materials of these polymers from biomass resources have attracted al lot of attention. Since these resources are renewable and therefore have a carbon-neutral biomass, such methods are expected to gain in particular importance in future.

EP 387664 discloses an aqueous synthetic resin dispersion having a minimum film forming temperature below 50° C. containing an emulsion polymer with a core/shell structure consisting of A) 65-90 percent by weight of a weakly crosslinked core polymer having a glass transition temperature below 0° C. and an extension at break of at least 150 percent and B) 10-35 percent by weight of an essentially non-crosslinked shell polymer having a glass transition temperature below 60° C., the glass transition temperature of said core polymer being at least 10° C. below that of said shell polymer.

U.S. Pat. No. 5,021,469 discloses a binder, for water based gloss paints contains, dispersed in a aqueous phase, particles of a multiphase emulsion polymer made up of (a) core material having a glass transition temperature exceeding 40° C. and (b) a shell material having a glass transition temperature of less than 70° C.

U.S. Pat. No. 4,654,397 discloses a process for the preparation of aqueous polymer dispersions which have a low film-forming temperature but still give films having a high block resistance, and the use of these polymer dispersions as binders for coating materials.

EP0758364 (=WO95-29963) discloses a process for making organic solvent-free aqueous cross-linkable polymer composition comprising an acid-functional polymer A with Tg 10 to 125° C. and having cross-linker functional groups and a polymer B having Tg at least 25° C. below that of polymer A in combination with a crosslinking agent having an advantageous balance of MFFT and Koenig hardness.

EP0758347 (=WO95-29944) discloses a process for making organic solvent-free aqueous cross-linkable polymer composition comprising an acid-functional polymer A with Tg less than 50° C. and having cross-linker functional groups and a polymer B having Tg at least 25° C. above that of the polymer A in combination with a crosslinking agent having an advantageous balance of MFFT and Koenig hardness.

FR 2943351 (Arkema) describes a polymer composition of a) a copolymer formed from i) at least one ($C_{1-4}$alkyl-methacrylate and/or $C_{1-8}$alkylacrylate); and ii) at least one vinylaromatic moiety, where component ii) comprises biomass derived carbon as measured by ASTM D6866

US 2003-035869 (Li Xiawei) describes an method for identifying for purely natural products (such as traditional Chinese medicine) by measuring the percentage of $^{14}C$ in the specimen by means of a liquid flashing arithmometer.

None of the above-discussed disclosures teaches a dispersion having the selected combination of features and integers as defined in the invention below which are utilised to produce a dispersion utilising bio-renewable monomers suitable for coating having such an advantageous combination of properties as discussed above.

The invention has as its object to provide a physically-drying binder in the form of an aqueous synthetic resin dispersion which physically dries at low temperatures to give highly elastic films which are more or less non-tacky from the beginning.

The solution of this problem is found in the emulsion polymers according to the invention. The designation of the polymer phase involved as a first phase or core material and second phase or shell material does not mean that the invention should be bound by any particular morphology of the latex particles. The term polymer phase is to be understood as meaning a portion of the emulsion polymer which is prepared during a temporally-limited segment of the emulsion polymerization and the dispersion of which differs from that of the foregoing or following phase. This is also known as a multi-stage polymerization.

The multiple-phase structure in any case has an essential influence on the properties of the film which is formed on drying of the dispersion.

We have now invented an aqueous vinyl polymer dispersion with an advantageous combination of MFFT and anti-blocking and which furthermore is prepared at least in part from bio-renewable monomers.

According to the present invention there is provided an aqueous polymer dispersion having a minimum film forming temperature below 50° C., more preferably below 30° C. comprising a vinyl polymer derived from olefinically unsaturated monomers, with at least two phases comprising:
  A) 40 to 90 wt %, more preferably 50 to 85 wt % and especially 60 to 80 wt % of a vinyl polymer A having a glass transition temperature in the range of from −50 to 30° C.; and B) 10 to 60 wt %, more preferably 15 to 50 wt % and especially 20 to 40 wt % of a vinyl polymer B having a glass transition temperature the range of from 50 to 130° C.;

where 10% by weight (preferably at least 20 wt %) of the total amount of monomer used to form vinyl polymer A and vinyl polymer B is derived from at least one bio-renewable olefinically unsaturated monomer;

where the weight percentage of monomers in A and B are calculated based on the total amount of olefinically unsaturated monomers used to prepare polymer A and polymer B=100%; and wherein vinyl polymer A comprises 0.1 to 10 wt % of at least one acid-functional olefinically unsaturated monomer; where the weight percentage of acid functional monomer is calculated based on the total amount of olefinically unsaturated monomer used to prepare polymer A=100%, Vinyl polymer A may be the first phase in which case vinyl polymer B is the second phase. Alternatively vinyl polymer B may be the first phase in which case vinyl polymer A is the second phase. Preferably vinyl polymer A is the first phase. Preferably the second phase vinyl polymer is prepared in the presence of the first phase vinyl polymer.

Preferably at least 30 wt %, more preferably at least 50 wt %, and especially 70 wt % of the olefinically unsaturated monomers used to form the vinyl polymer is derived from at least one bio-renewable olefinically unsaturated monomer. Bio-renewable monomers may be obtained fully or in part from bio-renewable sources. Thus it is preferred to also measure the carbon-14 content to determine the biorenewability.

The content of carbon-14 (C-14) is indicative of the age of a bio-based material. It is known in the art that C-14, which has a half life of about 5,700 years, is found in bio-renewable materials but not in fossil fuels. Thus, "bio-renewable materials" refer to organic materials in which the carbon comes from non-fossil biological sources. Examples of bio-renewable materials include, but are not limited to, sugars, starches, corns, natural fibres, sugarcanes, beets, citrus fruits, woody plants, cellulosics, lignocelluosics, hemicelluloses, potatoes, plant oils, other polysaccharides such as pectin, chitin, levan, and pullulan, and a combination thereof.

The term biorenewable materials as used herein preferably means materials where the level of carbon-14 (14C) isotopes in the material is comparable to the mean level of 14C in atmospheric $CO_2$ (e.g. as measured by ASTM D6866). Comparable as used herein means the value is within +/−6% of the value of the reference sample (described herein or in the standard test method used), more preferably within +/−5%, most preferably within +/−4%.

The percentage differences for comparable properties herein refer to fractional differences between the material tested and the reference where the property is measured in the same units in the same way (i.e. if the value to be compared is also measured as a percentage it does not denote an absolute difference).

More preferred biorenewable materials are those comprising an minimum amount of the C-14 isotope such that the C-14 level in the material satisfies one or more of the values as described herein.

C-14 levels can be determined by measuring its decay process (disintegrations per minute per gram carbon or dpm/gC) through liquid scintillation counting. In one embodiment of the present invention, polymer A and or polymer B comprise at least about 1.5 dpm/gC (disintegrations per minute per gram carbon) of carbon-14, more preferably at least 2 dpm/gC, most preferably at least 2.5 dpm/gC, and especially at least 4 dpm/gC.

Examples of bio-renewable monomers include but are not limited to bio-based acrylics obtained by for example using bio-derived alcohols such as bio-butanol and include (meth) acrylic acid and alkyl (meth)acrylate, where alkyl is preferably selected from methyl, ethyl, butyl or 2-ethylhexyl.

Acrylic acid can be made from glycerol, as is disclosed by Arkema, or from lactic acid as described by U.S. Pat. No. 7,687,661. Methacrylic acid can be prepared from ethene, methanol and carbon monoxide (all potentially bio-renewable), as disclosed by Lucite International Ltd.

Olefinically unsaturated bio-renewable monomers which may additionally provide a contribution to improved coating properties include α-methylene butyrolactone, α-methylene valerolactone, α-methylene γ-$R^1$ butyrolactone ($R^1$ can be an optionally substituted alkyl or optionally substituted aryl); itaconates such as dialkyl itaconates and monoalkyl itaconates, itaconic acid, itaconic anhydride, crotonic acid and alkyl esters thereof, citraconic acid and alkyl esters thereof, methylene malonic acid and its mono and dialkyl esters, citraconic anhydride, mesaconic acid and alkyl esters thereof.

Another useful set of useful bio-renewable monomers include N—$R^2$, α-methylene butyrolactam ($R^2$ can be an optionally substituted alkyl or optionally substituted aryl); N—$R^2$, α-methylene γ-$R^1$ butyrolactam; N-alkyl itaconimids; itaconmonoamids; itacondiamids; dialkyl itaconamides, mono alkyl itaconamides; furfuryl (meth)acrylate; fatty acid functional (meth)acrylates such as DAPRO FX-522 from Elementis and Visiomer® MUMA from Evonik.

Improved properties may include heat resistance, colloidal stability, pigment compatibility, surface activity, blocking resistance and reduced MFFT depending on the monomers used.

The monomer system used for the preparation of vinyl polymer A and vinyl polymer B is any suitable combination of olefinically unsaturated monomers which is amenable to copolymerisation (including the bio-renewable monomers described herein which may of course also be acid-functional, crosslinkable etc as described below.).

Acid-functional olefinically unsaturated monomers denotes such monomers that bear an acid-functional group and/or an acid-forming group which yields, or is subsequently convertible to, such an acid-functional group (such as an anhydride, e.g. methacrylic anhydride or maleic anhydride, or an acid.

Typically the acid-bearing co-monomers are carboxyl-functional acrylic monomers or other olefinically unsaturated carboxyl bearing monomers such as acrylic acid, methacrylic acid, itaconic acid and fumaric acid. Sulphonic acid-bearing monomers could also e.g. be used, such as styrene p-sulphonic acid (or correspondingly styrene p-sulphonyl chloride). An acid bearing monomer could be polymerised as the free acid or as a salt, e.g. the $NH_4$ or alkali metal salts of ethylmethacrylate-2-sulphonic acid or 2-acrylamido-2-methylpropane sulphonic acid, or the corresponding free acids.

Preferably the acid-functional olefinically unsaturated monomer is selected from the group consisting of acrylic acid, methacrylic acid, itaconic acid, crotonic acid and fumaric acid.

Preferably vinyl polymer A comprises 0.5 to 9 wt %, more preferably 1 to 8 wt % and especially 2 to 5 wt % of at least one acid-functional olefinically unsaturated monomer.

Preferably vinyl polymer B comprises less than 5 w % of any acid functional monomers and preferably less than 2 w %, and in some preferred embodiments none at all.

Other, non-acid functional, non-crosslinking monomers which may be copolymerized with the acid monomers include acrylate and methacrylate esters and styrenes; also dienes such as 1,3-butadiene and isoprene, vinyl esters such as vinyl acetate, and vinyl alkanoates. Methacrylates include normal or branched alkyl esters of C1 to C12 alcohols and methacrylic acid, such as methyl methacrylate, ethyl methacrylate, and n-butyl methacrylate, and (usually C5 to C12) cycloalkyl methacrylates acid such as isobornyl methacrylate and cyclohexyl methacrylate. Acrylates include normal and branched alkyl esters of C1 to C12 alcohols and acrylic acid, such as methyl acrylate, ethyl acrylate, n-butyl acrylate, and 2-ethylhexyl acrylate, and (usually C5-C12) cycloalkyl acrylates such as isobornyl acrylate and cyclohexylacrylate. Styrenes include styrene itself and the various substituted styrenes, such as .alpha.-methyl styrene and t-butyl styrene. Nitriles such as acrylonitrile and methacrylonitrile may also be polymerised, as well as olefinically unsaturated halides such as vinyl chloride, vinylidene chloride and vinyl fluoride.

Functional monomers which impart crosslinkability (crosslinking monomers for short) include epoxy (usually glycidyl) and hydroxyalkyl (usually C1-C12, e.g. hydroxyethyl)methacrylates and acrylates, as well as keto or aldehyde functional monomers such as acrolein, methacrolein and vinyl methyl ketone, the acetoacetoxy esters of hydroxyalkyl (usually C1-C12) acrylates and methacrylates such as acetoacetoxyethyl methacrylate and acrylate, and also keto-containing amides such as diacetone acrylamide. The purpose of using such functional monomer is to provide subsequent crosslinkability in the resulting polymer system as discussed. (In principle the functional monomer used for imparting crosslinkability could be acid-bearing monomer, but this is not usual).

Preferably vinyl polymer A comprises 0.5 to 20 wt % of at least one crosslinking monomer containing at least two olefinically unsaturated groups.

Preferably vinyl polymer B comprises 0.1 to 20 w %, preferably 1 to 15 w %, and particularly 1 to 10 w % of crosslinking monomers.

Adhesion promoting monomers include amino, urea, or N-heterocyclic groups. As known to those skilled in the art this property can also be achieved by immination i.e. reaction of the acid groups with propylene imine.

Preferably vinyl polymer A comprises 0.4 to 6 wt % of at least one olefinically unsaturated monomer with a wet-adhesion promoting functionality.

Vinyl polymer A preferably has a molecular weight within the range of from 20,000 to 6,000,000 g/mol, preferably more than 80,000 g/mol and most preferably more than 100,000 g/mol. More preferably the upper limit does not exceed 4,000,000 g/mol.

Vinyl polymer B preferably has a molecular weight within the range of from 20,000 to 6,000,000 g/mol, preferably more than 80,000 g/mol and most preferably more than 100,000 g/mol. More preferably the upper limit does not exceed 4,000,000 g/mol.

Preferably vinyl polymer A has a glass transition temperature in the range of from −20 to 20° C.

Preferably vinyl polymer B has a glass transition temperature in the range of from 65 to 110° C.

Preferably the polymer dispersion contains latex particles having a diameter from 30 to 900 nanometers (nm), particularly 60 to 300 nm. The particle size distribution can be unimodal, bimodal, or polymodal. Dispersions having bi- or poly-modal particle size distributions can be made according to the method described in DE3147008 or U.S. Pat. No. 4,456,726.

In a preferred embodiment, the polymer dispersion according to the invention is blended with a second emulsion comprising polyvinyl polymer with a Tg of at least 60° C., more preferred at least 80° C. (a high Tg polyvinyl polymer). The average particle size of the second emulsion is preferably less than 200 nm, more preferred less than 80 nm, and most preferred between 30 and 75 nm. The weight ratio of emulsion according to the invention and the high Tg polyvinyl polymer is preferably between 97.5:2.5 and 75:25, more preferred between 95:5 and 85:15 (based on solid polymer).

In a preferred embodiment there is provided an aqueous polymer dispersion having a minimum film forming temperature below 30° C. comprising a vinyl polymer derived from olefinically unsaturated monomers, with at least two phases comprising:
  A) 60 to 80 wt % of a vinyl polymer A having a glass transition temperature in the range of from −20 to 20° C.; and
  B) 20 to 40 wt % of a vinyl polymer B having a glass transition temperature the range of from 65 to 110° C.;
  wherein vinyl polymer A comprises 2 to 5 wt % of at least one acid-functional olefinically unsaturated monomer, and
  wherein at least 50 wt % of the monomer composition used to form vinyl polymer A and vinyl polymer B is derived from at least one bio-renewable olefinically unsaturated monomer.

If vinyl polymer A is made in the second phase then preferably vinyl polymer A has at least 80%, more preferably at least 100% and most preferably 110% of the acid value of vinyl polymer B being made in the first phase and this helps to affect the morphology of the particles to get good film formation.

According to an embodiment of the invention there is also provided a process to obtain an aqueous polymer dispersion as defined herein which process comprises steps:
  a) a first polymerization step, to form a first phase vinyl polymer;
  b) a second polymerization step in the presence of the resulting first phase vinyl polymer from step a) to form a second phase vinyl polymer.

The first phase vinyl polymer may be formed using emulsion polymerisation. Such a processes is extremely well known and need not be described in great detail. Suffice to say that such an emulsion process involves dispersing the monomers in an aqueous medium and conducting polymerisation using a free-radical initiator (normally water soluble) and appropriate heating (e.g. 30 to 120°) and agitation (stirring) being employed.

The aqueous emulsion polymerisation can be effected with conventional emulsifying agents (surfactants) being used such as anionic and/or non-ionic emulsifiers. The amount used is preferably low, preferably 0.3 to 2% by weight, more usually 0.3 to 1% by weight based on the weight of total monomers charged.

The aqueous emulsion polymerisation can employ conventional free radical initiators such as peroxides, persulphates and redox systems as are well known in the art. The amount of initiator used is generally 0.05 to 3% based on the weight of total monomers charged.

The aqueous emulsion polymerisation process may be carried out using an "all-in-one" batch process (i.e. a process in which all the components to be employed are present in the polymerisation medium at the start of polymerisation) or a semi-batch process in which one or more of the components employed (usually at least one of the monomers), is wholly or partially fed to the polymerisation medium during the polymerisation. Although not preferred, fully continuous processes could also be used in principle. Preferably a semi-batch process is employed.

The polymerisation technique employed may be such that a low molecular weight polymer is formed, e.g. by employing a chain transfer agent such as one selected from mercaptans (thiols), certain halohydrocarbons and alpha-methyl styrene; or catalytic chain transfer polymerisation using for example cobalt chelate complexes as is quite conventional. Alternatively a controlled radical polymerisation process can be used, for instance by making use of an appropriate nitroxide or a thiocarbonylthio compounds such as dithioesters, dithiocarbamates, trithiocarbonates, and xanthates in order to mediate the polymerization via for example a nitrox mediated polymerisation (NMP), a reversible addition fragmentation chain-transfer process (RAFT) or atom transfer radical polymerization (ATRP).

The polymerisation is preferably generally performed under acidic conditions, i.e. pH<7, although performing the polymerisation can also be done at higher pH. Preferably, pH is raised at the end of the polymerisation process. This can be done with (organic) amines and/or with inorganic bases. Examples of such bases include organic amines such as trialkylamines (e.g. triethylamine, tributylamine), morpholine and alkanolamines, and inorganic bases such as ammonia, NaOH, KOH, and LiOH. Of course, the aqueous medium containing vinyl polymer A may already be alkaline (or sufficiently alkaline) such that the acid groups (such as carboxyl groups) become neutralized without the requirement for positively adding a base to raise pH, or the acid groups may be or include very strong acid groups such as sulphonic acid groups (pKa 1 to 2) so that neutralization may not be necessary. Further still, it is possible for acid monomers to be polymerised in salt form rather than as the free acid.

In an embodiment of the invention it is also possible to use a gradient polymerisation process as described in for example EP1434803 to make at least part of the first and second phase. The second phase monomer feed preferably starts after 20 to 80% completion of the first phase monomer feed.

The preferred polymerisation process is a sequential one. It is, however, possible that the separate monomer feeds are fed to the reactor (partially) simultaneously. This can be for instance for less than 90% of total monomer feed time, more preferred less than 70%, most preferred less than 50% of the total monomer feed time, and especially preferred less than 5% of the total monomer feed time.

In a preferred embodiment when >30 wt % of dialkyl itaconate is used, like dimethyl itaconate, the monomers are preferably fed into the reactor during polymerisation, with a preferred feed time >60 minutes, more preferably >120 minutes and most preferred >150 minutes.

In a preferred embodiment of the invention, the polymer dispersion of the invention contains dialkyl methylidene malonates as partially bio-renewable co-monomer. The pH of the monomer feed and of the reactor phase is maintained acidic (i.e. pH<7, more preferred, however, pH<5, most preferred pH<4). Preferably, the dialkyl methylidene malonate concentration is at least 25% on total weight of solid polymer in the polymer dispersion. It is preferred that all dialkyl methylidene malonate monomer is co-polymerised in either the vinyl polymer A or vinyl polymer B.

In yet another preferred embodiment of the invention the reactor phase is buffered at pH>7, more preferred at pH>7.5, most preferred at pH>8, while the monomer feed is kept acidic, while the rest of the conditions apply as described above.

The polymerisation to make the second phase vinyl polymer could also be carried out using a chain transfer agent.

Preferably the dispersions of the invention have VOC levels of less than 100 g/L and more preferably less than 80 g/L, most preferably less than 50 g/L and especially less than 20 g/L of volatile organic components (VOC) such as coalescing solvents.

In another embodiment of the invention the monomer feeds that are used in the polymerisation step of vinyl polymers A and B may comprise between 0.2 and 20 wt % of coalescing agent, more preferably between 0.5 and 10 wt %, based on total weight of the respective monomers to be polymerised to form each of the vinyl polymers A or B. In a more preferred case only the monomer feed that is used to prepare vinyl polymer B comprises a coalescing agent.

Preferred coalescing agents can be, but are not limited to, ethylene glycol ethers, propylene glycol ethers, such as for instance propylene glycol methyl ether, propylene glycol ethyl ether, propylene glycol butyl ether, ethylene glycol methyl ether, ethylene glycol ethyl ether, ethylene glycol butyl ether, diethylene glycol ethers, such as diethylene glycol methyl ether, diethylene glycol ethyl ether, diethylene glycol butyl ether, (di)propylene glycol esters or (di)ethylene glycol esters, such as propylene glycol methyl ether acetate, dipropylene glycol methyl ether acetate, ethylene glycol methyl ether acetate, or diethylene glycol butyl ether acetate. Other examples of coalescing agents are, for instance, Texanol (ex. Eastman), or Dowanol MPA (methoxy propyl acetate).

If crosslinking monomers are present then preferably the amount of crosslinking agent that is employed is such that the ratio of the number of crosslinker groups present in the first phase vinyl polymer and (if employed) in the second phase vinyl polymer to the number of reactive groups (for crosslinking purposes) in the crosslinking agent is within the range of from 10/1 to 1/3, preferably 2/1 to 1/1.5.

The crosslinker is usually combined with the aqueous dispersion by adding it thereto after the preparation of the second phase vinyl polymer (and sometimes just before use of the dispersion), although it may in principle also be combined by performing the polymerisation of the second phase vinyl polymer in the presence of the crosslinking agent. A combination of both incorporation expedients may also in principle be used.

It will be appreciated that vinyl polymer A and optionally vinyl polymer B possess functional groups for imparting latent crosslinkability to the dispersion (i.e. so that crosslinking takes place e.g. after the formation of a coating therefrom) when combined with the crosslinking agent. For example, one or both polymers could carry functional groups such as hydroxyl groups and the dispersion subsequently formulated with a crosslinking agent such as a polyisocyanate, melamine, or glycoluril; or the functional groups on one or both polymers could include keto or aldehyde carbonyl groups and the subsequently formulated crosslinker in step c) could be a polyamine or polyhydrazide such as adipic acid dihydrazide, oxalic acid dihydrazide, phthalic acid dihydrazide, terephthalic acid dihydrazide, isophorone diamine and 4,7-dioxadecane-1,10 diamine. It will be noted that such crosslinking agents will effect crosslinking by virtue of forming covalent bonds.

According to an embodiment of the invention there is provided a process for the production of the aqueous polymer coating dispersion, which process comprises steps:
- a) a first polymerization step, to form a first phase vinyl polymer;
- b) a second polymerization step in the presence of the resulting first phase vinyl polymer from step a) to form a second phase vinyl polymer. Optionally the process includes c) a neutralisation step before/after or during step b).

Optionally the process includes a post treatment imination step d) with alkylene imines like for instance propylene imine) which can greatly improve wet adhesion.

Optionally the process includes e) the addition of a crosslinking agent after the polymerization step a) and/or step b), said crosslinking agent being reactable with any crosslinking functional groups of vinyl polymer A and/or vinyl polymer B on subsequent drying of the coating dispersion to effect covalent bond crosslinking.

The minimum film forming temperature (MFFT) of a dispersion as used herein is the temperature where the dispersion forms a smooth and crack free coating or film using DIN 53787 and when applied using a Sheen MFFT bar SS3000.

Koenig hardness as used herein is a standard measure of hardness, being a determination of how the viscoelastic properties of a film formed from the dispersion slows down a swinging motion deforming the surface of the film, and is measured according to DIN 53157 NEN5319.

As is well known, the glass transition temperature of a polymer is the temperature at which it changes from a glassy, brittle state to a plastic, rubbery state. The glass transition temperatures may be determined experimentally using differential scanning calorimetry DSC, taking the peak of the derivative curve as Tg, or calculated from the Fox equation. Thus the Tg, in degrees Kelvin, of a copolymer having "n" copolymerised co-monomers is given by the weight fractions W of each comonomer type and the Tg of the homopolymer (in degrees Kelvin) derived from each comonomer according to the equation:

$$\frac{1}{Tg} = \frac{W_1}{Tg_1} + \frac{W_2}{Tg_2} + \ldots \frac{W_n}{Tg_n}$$

The calculated Tg in degrees Kelvin may be readily converted to ° C.

The solids content of an aqueous dispersion of the invention is usually within the range of from about 20 to 65 wt % on a total weight basis, more usually 30 to 55 wt %. Solids content can, if desired, be adjusted by adding water or removing water (e.g. by distillation or ultrafiltration). The pH value of the dispersion of the invention can be from 2 to 10 and mostly is from 6 to 9.5.

The aqueous dispersions of the invention may be used in various applications and for such purposes may be optionally further combined or formulated with other additives or components, such as defoamers, rheology control agents, thickeners, dispersing and stabilizing agents (usually surfactants), wetting agents, fillers, extenders, fungicides, bactericides, coalescing and wetting solvents (although solvents are not normally required), plasticisers, anti-freeze agents, waxes and pigments.

The dispersion of the invention may also contain other polymers such as vinyl polymers, alkyds (saturated or unsaturated), polyesters and or polyurethanes. These include low or high Tg particles and preferably include particles with an average particle size of less than 100 nm). These may be blended into the dispersion to improve film forming if low Tg (<30° C.) particles are used and to improve the blocking resistance of a resulting coating if high Tg (>50° C.) particles are used.

The aqueous dispersions may e.g. be used, appropriately formulated if necessary, for the provision of films, polishes, varnishes, lacquers, paints, inks and adhesives. However, they are particularly useful and suitable for providing the basis of protective coatings for wooden substrates (e.g. wooden floors), and plastics, paper and metal substrates.

The dispersions once applied may be allowed to dry naturally at ambient temperature, or the drying process may be accelerated by heat. Crosslinking can be developed by allowing to stand for a prolonged period at ambient temperature (several days) or by heating at an elevated temperature (e.g. 50° C.) for a much shorter period of time.

In yet another preferred embodiment of the invention there is provided a coating composition comprising opacifiers, which may include titanium dioxide, calcium carbonate and hollow particles such as Ropaque™.

Preferably, the coating composition comprises a binder composition as described in the embodiment above combined with Ropaque™ hollow particles.

Examples of these hollow particles include Ropaque™ ULTRA, Ropaque™ ULTRA E, Ropaque™ ULTRA EF, or Ropaque™ DUAL, all supplied by DOW.

It is appreciated that certain features of the invention, which are for clarity described in the context of separate embodiments may also be provided in combination in a single embodiment. Conversely various features of the invention, which are for brevity, described in the context of a single embodiment, may also be provided separately or in any suitable sub-combination.

Unless the context clearly indicates otherwise, as used herein plural forms of the terms herein are to be construed as including the singular form and vice versa.

The term "comprising" as used herein will be understood to mean that the list following is non exhaustive and may or may not include any other additional suitable items, for example one or more further feature(s), component(s), ingredient(s) and/or substituent(s) as appropriate.

The terms 'effective', 'acceptable', 'active' and/or 'suitable' (for example with reference to any process, use, method, application, preparation, product, material, formulation, compound, monomer, oligomer, polymer precursor, and/or polymers described herein as appropriate) will be understood to refer to those features of the invention which if used in the correct manner provide the required properties to that which they are added and/or incorporated to be of utility as described herein. Such utility may be direct for example where a material has the required properties for the aforementioned uses and/or indirect for example where a material has use as a synthetic intermediate and/or diagnostic tool in preparing other materials of direct utility. As used herein these terms also denote that a functional group is compatible with producing effective, acceptable, active and/ or suitable end products.

Preferred utility of the present invention comprises as a coating composition.

In the discussion of the invention herein, unless stated to the contrary, the disclosure of alternative values for the upper and lower limit of the permitted range of a parameter coupled with an indicated that one of said values is more preferred than the other, is to be construed as an implied statement that each intermediate value of said parameter, lying between the more preferred and less preferred of said alternatives is itself preferred to said less preferred value and also to each less preferred value and said intermediate value.

For all upper and/or lower boundaries of any parameters given herein, the boundary value is included in the value for each parameter. It will also be understood that all combinations of preferred and/or intermediate minimum and maximum boundary values of the parameters described herein in various embodiments of the invention may also be used to define alternative ranges for each parameter for various other embodiments and/or preferences of the invention whether or not the combination of such values has been specifically disclosed herein.

It will be understood that the total sum of any quantities expressed herein as percentages cannot (allowing for rounding errors) exceed 100%. For example the sum of all components of which the composition of the invention (or part(s) thereof) comprises may, when expressed as a weight (or other) percentage of the composition (or the same part(s) thereof), total 100% allowing for rounding errors. However where a list of components is non exhaustive the sum of the percentage for each of such components may be less than 100% to allow a certain percentage for additional amount(s) of any additional component(s) that may not be explicitly described herein.

The term "substantially" as used herein may refer to a quantity or entity to imply a large amount or proportion thereof. Where it is relevant in the context in which it is used "substantially" can be understood to mean quantitatively (in relation to whatever quantity or entity to which it refers in the context of the description) there comprises an proportion of at least 80%, preferably at least 85%, more preferably at least 90%, most preferably at least 95%, especially at least 98%, for example about 100% of the relevant whole. By analogy the term "substantially-free" may similarly denote that quantity or entity to which it refers comprises no more than 20%, preferably no more than 15%, more preferably no more than 10%, most preferably no more than 5%, especially no more than 2%, for example about 0% of the relevant whole.

The terms 'optional substituent' and/or 'optionally substituted' as used herein (unless followed by a list of other substituents) signifies the one or more of following groups (or substitution by these groups): carboxy, sulpho, formyl, hydroxy, amino, imino, nitrilo, mercapto, cyano, nitro, methyl, methoxy and/or combinations thereof. These optional groups include all chemically possible combinations in the same moiety of a plurality (preferably two) of the aforementioned groups (e.g. amino and sulphonyl if directly attached to each other represent a sulphamoyl group). Preferred optional substituents comprise: carboxy, sulpho, hydroxy, amino, mercapto, cyano, methyl, halo, trihalomethyl and/or methoxy.

The synonymous terms 'organic substituent' and "organic group" as used herein (also abbreviated herein to "organo") denote any univalent or multivalent moiety (optionally attached to one or more other moieties) which comprises one or more carbon atoms and optionally one or more other heteroatoms. Organic groups may comprise organoheteryl groups (also known as organoelement groups) which comprise univalent groups containing carbon, which are thus organic, but which have their free valence at an atom other than carbon (for example organothio groups). Organic groups may alternatively or additionally comprise organyl groups which comprise any organic substituent group, regardless of functional type, having one free valence at a carbon atom. Organic groups may also comprise heterocyclyl groups which comprise univalent groups formed by removing a hydrogen atom from any ring atom of a heterocyclic compound: (a cyclic compound having as ring members atoms of at least two different elements, in this case one being carbon). Preferably the non carbon atoms in an organic group may be selected from: hydrogen, halo, phosphorus, nitrogen, oxygen, silicon and/or sulphur, more preferably from hydrogen, nitrogen, oxygen, phosphorus and/or sulphur.

Most preferred organic groups comprise one or more of the following carbon containing moieties: alkyl, alkoxy, alkanoyl, carboxy, carbonyl, formyl and/or combinations thereof; optionally in combination with one or more of the following heteroatom containing moieties: oxy, thio, sulphinyl, sulphonyl, amino, imino, nitrilo and/or combinations thereof. Organic groups include all chemically possible combinations in the same moiety of a plurality (preferably two) of the aforementioned carbon containing and/or heteroatom moieties (e.g. alkoxy and carbonyl if directly attached to each other represent an alkoxycarbonyl group).

The term 'hydrocarbo group' as used herein is a sub-set of a organic group and denotes any univalent or multivalent moiety (optionally attached to one or more other moieties) which consists of one or more hydrogen atoms and one or more carbon atoms and may comprise one or more saturated, unsaturated and/or aromatic moieties. Hydrocarbo groups may comprise one or more of the following groups. Hydrocarbyl groups comprise univalent groups formed by removing a hydrogen atom from a hydrocarbon (for example alkyl). Hydrocarbylene groups comprise divalent groups formed by removing two hydrogen atoms from a hydrocarbon, the free valencies of which are not engaged in a double bond (for example alkylene). Hydrocarbylidene groups comprise divalent groups (which may be represented by "$R_2C=$") formed by removing two hydrogen atoms from the same carbon atom of a hydrocarbon, the free valencies of which are engaged in a double bond (for example alkylidene). Hydrocarbylidyne groups comprise trivalent groups (which may be represented by "$RC\equiv$"), formed by removing three hydrogen atoms from the same carbon atom of a hydrocarbon the free valencies of which are engaged in a triple bond (for example alkylidyne). Hydrocarbo groups may also comprise saturated carbon to carbon single bonds (e.g. in alkyl groups); unsaturated double and/or triple carbon to carbon bonds (e.g. in respectively alkenyl and alkynyl groups); aromatic groups (e.g. in aryl groups) and/or combinations thereof within the same moiety and where indicated may be substituted with other functional groups The term 'alkyl' or its equivalent (e.g. 'alk') as used herein may be readily replaced, where appropriate and unless the context clearly indicates otherwise, by terms encompassing any other hydrocarbo group such as those described herein (e.g. comprising double bonds, triple bonds, aromatic moieties (such as respectively alkenyl, alkynyl and/or aryl) and/or combinations thereof (e.g. aralkyl) as well as any multivalent hydrocarbo species linking two or more moieties (such as bivalent hydrocarbylene radicals e.g. alkylene).

Any radical group or moiety mentioned herein (e.g. as a substituent) may be a multivalent or a monovalent radical unless otherwise stated or the context clearly indicates otherwise (e.g. a bivalent hydrocarbylene moiety linking two other moieties). However where indicated herein such monovalent or multivalent groups may still also comprise optional substituents. A group which comprises a chain of three or more atoms signifies a group in which the chain wholly or in part may be linear, branched and/or form a ring (including spiro and/or fused rings). The total number of certain atoms is specified for certain substituents for example $C_{1-N}$organo, signifies a organo moiety comprising from 1 to N carbon atoms. In any of the formulae herein if one or more substituents are not indicated as attached to any particular atom in a moiety (e.g. on a particular position along a chain and/or ring) the substituent may replace any H and/or may be located at any available position on the moiety which is chemically suitable and/or effective.

Preferably any of the organo groups listed herein comprise from 1 to 36 carbon atoms, more preferably from 1 to 18. It is particularly preferred that the number of carbon atoms in an organo group is from 1 to 12, especially from 1 to 10 inclusive, for example from 1 to 4 carbon atoms.

As used herein chemical terms (other than IUAPC names for specifically identified compounds) which comprise features which are given in parentheses—such as (alkyl)acrylate, (meth)acrylate and/or (co)polymer—denote that that part in parentheses is optional as the context dictates, so for example the term (meth)acrylate denotes both methacrylate and acrylate.

Certain moieties, species, groups, repeat units, compounds, oligomers, polymers, materials, mixtures, compositions and/or formulations which comprise and/or are used in some or all of the invention as described herein may exist as one or more different forms such as any of those in the following non exhaustive list: stereoisomers (such as enantiomers (e.g. E and/or Z forms), diastereoisomers and/or geometric isomers); tautomers (e.g. keto and/or enol forms), conformers, salts, zwitterions, complexes (such as chelates, clathrates, crown compounds, cyptands/cryptades, inclusion compounds, intercalation compounds, interstitial compounds, ligand complexes, organometallic complexes, non-stoichiometric complexes, $\pi$(pi)-adducts, solvates and/or hydrates); isotopically substituted forms, polymeric configurations [such as homo or copolymers, random, graft and/or block polymers, linear and/or branched polymers (e.g. star and/or side branched), cross-linked and/or networked polymers, polymers obtainable from di and/or trivalent repeat units, dendrimers, polymers of different tacticity (e.g. isotactic, syndiotactic or atactic polymers)]; polymorphs (such as interstitial forms, crystalline forms and/or amorphous forms), different phases, solid solutions; and/or combinations thereof and/or mixtures thereof where possible. The present invention comprises and/or uses all such forms which are effective as defined herein.

Polymers of the present invention may be prepared by one or more suitable polymer precursor(s) which may be organic and/or inorganic and comprise any suitable (co)monomer(s), (co)polymer(s) [including homopolymer(s)] and mixtures thereof which comprise moieties which are capable of forming a bond with the or each polymer precursor(s) to provide chain extension and/or cross-linking with another of the or each polymer precursor(s) via direct bond(s) as indicated herein.

Polymer precursors of the invention may comprise one or more monomer(s), oligomer(s), polymer(s); mixtures thereof and/or combinations thereof which have suitable polymerisable functionality.

A monomer is a substantially monodisperse compound of a low molecular weight (for example less than one thousand daltons) which is capable of being polymerised.

A polymer is a polydisperse mixture of macromolecules of large molecular weight (for example many thousands of daltons) prepared by a polymerisation method, where the macromolecules comprises the multiple repetition of smaller units (which may themselves be monomers, oligomers and/or polymers) and where (unless properties are critically dependent on fine details of the molecular structure) the addition or removal one or a few of the units has a negligible effect on the properties of the macromolecule.

A oligomer is a polydisperse mixture of molecules having an intermediate molecular weight between a monomer and polymer, the molecules comprising a small plurality of monomer units the removal of one or a few of which would significantly vary the properties of the molecule.

Depending on the context the term polymer may or may not encompass oligomer.

The polymer precursor of and/or used in the invention may be prepared by direct synthesis or (if the polymeric precursor is itself polymeric) by polymerisation. If a polymerisable polymer is itself used as a polymer precursor of and/or used in the invention it is preferred that such a polymer precursor has a low polydispersity, more preferably is substantially monodisperse, to minimise the side reactions, number of by-products and/or polydispersity in any polymeric material formed from this polymer precursor. The polymer precursor(s) may be substantially un-reactive at normal temperatures and pressures.

Except where indicated herein polymers and/or polymeric polymer precursors of and/or used in the invention can be (co)polymerised by any suitable means of polymerisation well known to those skilled in the art. Examples of suitable methods comprise: thermal initiation; chemical initiation by adding suitable agents; catalysis; and/or initiation using an optional initiator followed by irradiation, for example with electromagnetic radiation (photo-chemical initiation) at a suitable wavelength such as UV; and/or with other types of radiation such as electron beams, alpha particles, neutrons and/or other particles.

The substituents on the repeating unit of a polymer and/or oligomer may be selected to improve the compatibility of the materials with the polymers and/or resins in which they may be formulated and/or incorporated for the uses described herein. Thus the size and length of the substituents may be selected to optimise the physical entanglement or interlocation with the resin or they may or may not comprise other reactive entities capable of chemically reacting and/or cross linking with such other resins as appropriate.

The present invention is now further illustrated, but in no way limited, by reference to the following examples. Unless otherwise specified all parts, percentages, and ratios are on a weight basis. The prefix C before an example indicates that it is comparative.

Various registered trademarks, other designations and/or abbreviations are used herein to denote some of ingredients used to prepare polymers and compositions of the invention. These are identified below by chemical name and/or tradename and optionally their manufacturer or supplier from whom they are available commercially. However where a chemical name and/or supplier of a material described herein is not given it may easily be found for example in reference literature well known to those skilled in the art: such as: 'McCutcheon's Emulsifiers and Detergents', Rock Road, Glen Rock, N.J. 07452-1700, USA, 1997 and/or Hawley's Condensed Chemical Dictionary (14th Edition) by Lewis, Richard J., Sr.; John Wiley & Sons.

AA=acrylic acid (may be biorenewable)
MMA=methyl methacrylate (may be biorenewable)
MAA=methacrylic acid (may be biorenewable)
BMA=n-butyl methacrylate (may be biorenewable)

BA=n-butyl acrylate (may be biorenewable)
EDTA=ethylenediamine tetraacetic acid
DMI=dimethyl itaconate (bio-renewable)
DEI=diethyl itaconate (bio-renewable)
MBI=monobutyl itaconate (bio-renewable)
DAAM=diacetone acrylamide Block Resistance Measurement [Includes Blocking and Early Blocking]:

Step 1: Blocking:

A 100 micron wet film of the aqueous emulsion of the invention to which 10% butyldiglycol is added is cast on to a paper substrate and dried for 16 hours at 52° C.

Step 1: Early Blocking:

A 250 micron wet film of the aqueous emulsion of the invention to which 10% butyldiglycol was added, is cast on to a paper substrate and dried for 24 hours at room temperature.

Step 2: Blocking and Early Blocking:

After cooling down to room temperature two pieces of coated film are placed with the coated side against each other under a load of 1 Kg/cm.sup.2 for 4 hours at 52° C. After this time interval the load on the samples is removed and the samples are left to cool down to room temperature (22+-2° C.). When the two coatings can be removed from each other without any damage to the film (do not stick) the block resistance is very good and assessed as a 5. When they however completely stick together, block resistance is very bad and assessed as a 0.

Determination of Molecular Weight of a Polymer:

The molecular weight of a polymer may be determined using Size Exclusion Chromatography with tetrahydrofuran as the eluent or with 1,1,1,3,3,3 hexafluoro isopropanol as the eluent.

1) Tetrahydrofuran

The SEC analyses were performed on an Alliance Separation Module (Waters 2690), including a pump, auto injector, degasser, and column oven. The eluent was tetrahydrofuran (THF) with the addition of 1.0 vol % acetic acid. The injection volume was 150 µl. The flow was established at 1.0 ml/min. Three PL MixedB (Polymer Laboratories) with a guard column (3 µm PL) were applied at a temperature of 40° C. The detection was performed with a differential refractive index detector (Waters 410). The sample solutions were prepared with a concentration of 20 mg solids in 8 ml THF (+1 vol % acetic acid), and the samples were dissolved for a period of 24 hours. Calibration is performed with eight polystyrene standards (polymer standard services), ranging from 500 to 4,000,000 g/mol. The calculation was performed with Millenium 32 software (Waters) with a third order calibration curve. The obtained molar masses are polystyrene equivalent molar masses (g/mol).

2) 1,1,1,3,3,3 Hexafluoro Isopropanol

The SEC analyses were performed on a Waters Alliance 2695 (pump, degasser and autosampler) with a Shodex RI-101 differential refractive index detector and Shimadzu CTO-20AC column oven. The eluent was 1,1,1,3,3,3 hexafluoro isopropanol (HFIP) with the addition of 0.2M potassium trifluoro actetate (KTFA). The injection volume was 50 µl. The flow was established at 0.8 ml/min. Two PSS PFG Linear XL columns (Polymer Standards Service) with a guard column (PFG PSS) were applied at a temperature of 40° C. The detection was performed with a differential refractive index detector. The sample solutions were prepared with a concentration of 5 mg solids in 2 ml HFIP (+0.2M KTFA), and the samples were dissolved for a period of 24 hours. Calibration is performed with eleven polymethyl methacrylate standards (polymer standard services), ranging from 500 to 2,000,000 g/mol. The calculation was performed with Empower Pro software (Waters) with a third order calibration curve. The molar mass distribution is obtained via conventional calibration and the molar masses are polymethyl methacrylate equivalent molar masses (g/mol).

EXAMPLE 1

To a round-bottomed flask equipped with a condenser, thermometer and mechanical stirrer 70.1 parts of demineralised water are charged and heated to 80° C. At 80° C. 0.06 parts of sodium bicarbonate and 5.138 of Surfagene FAZ109 are charged to the reactor, followed by 0.07 parts of a 25% ammonia solution in water.

A solution of 0.06 parts of ammonium persulphate dissolved in 1.3 parts of demineralised water is added to the reactor. Immediately thereafter 10% of an emulsified monomer feed, comprising 3.76 parts of acrylic acid, 21.45 parts of methyl methacrylate, 49.91 parts of butyl acrylate, 0.09 parts of sodium bicarbonate, 6.23 parts of Surfagene FAZ109 and 20.28 parts of demineralised water, is added. The temperature will rise to 90° C. At 90° C., 67% of an initiator feed, comprising 0.32 parts of ammonium persulphate, 0.04 parts of sodium bicarbonate, and 5.96 parts of demineralised water, is started together with the remainder of the monomer feed. The monomer feed should be completed in 50 minutes, the initiator feed in 75 minutes. At the end of the monomer feed the feed tank is rinsed with 1.25 parts of demineralised water. At the end of the monomer feed a mixture of 0.15 parts of a 25% ammonia solution in water and 0.19 parts of demineralised water are feed to the reactor in 15 minutes. At the end of the initiator feed 2.52 parts of demineralised water are added to the initiator feed.

45 minutes after completion of the monomer feed a second monomer feed, comprising 1.29 parts of acrylic acid, 26.32 parts of methyl methacrylate, 4.58 parts of butyl methacrylate, 0.06 parts of sodium bicarbonate, 3.59 parts of Surfagene FAZ109, and 12.73 parts of demineralised water, is started together with the remainder of the initiator feed. Both feeds should take 25 minutes. At the end of the monomer feed the feed tank is rinsed with 1.25 parts of demineralised water. Finally, the solids content of the emulsion is adjusted to 45% using demineralised water and the pH is adjusted to 7.5 using a 25% ammonia solution in water.

EXAMPLE 2

To a round-bottomed flask equipped with a condenser, thermometer and mechanical stirrer 70.1 parts of demineralised water are charged and heated to 80° C. At 80° C. 0.06 parts of sodium bicarbonate and 5.138 of Surfagene FAZ109 are charged to the reactor, followed by 0.07 parts of a 25% ammonia solution in water.

A solution of 0.06 parts of ammonium persulphate dissolved in 1.3 parts of demineralised water is added to the reactor. Immediately thereafter 10% of an emulsified monomer feed, comprising 3.22 parts of acrylic acid, 22.38 parts of dimethyl itaconate, 38.78 parts of butyl acrylate, 0.09 parts of sodium bicarbonate, 6.23 parts of Surfagene FAZ109 and 20.28 parts of demineralised water, is added. The temperature will rise to 90° C. At 90° C., 67% of an initiator feed, comprising 0.32 parts of ammonium persulphate, 0.04 parts of sodium bicarbonate, and 5.96 parts of demineralised water, is started together with the remainder of the monomer feed. The monomer feed should be completed in 110 minutes, the initiator feed in 125 minutes. At the end of the monomer feed the feed tank is rinsed with 1.25 parts of demineralised water. At the end of the monomer feed a mixture of 0.15 parts of a 25% ammonia solution in water and 0.19 parts of demineralised water are feed to the reactor in 15 minutes. At the end of the initiator feed 2.52 parts of demineralised water are added to the initiator feed.

45 minutes after completion of the monomer feed a second monomer feed, comprising 1.72 parts of acrylic acid, 13.47 parts of methyl methacrylate, 25.75 parts of dimethyl itaconate, 1.98 parts of butyl methacrylate, 0.06 parts of sodium bicarbonate, 3.59 parts of Surfagene FAZ109, and 12.73 parts of demineralised water, is started together with the remainder of the initiator feed. Both feeds should take 65 minutes. At the end of the monomer feed the feed tank is rinsed with 1.25 parts of demineralised water. Finally, the solids content of the emulsion is adjusted to 45% using demineralised water and the pH is adjusted to 7.5 using a 25% ammonia solution in water.

EXAMPLE 3

To a round-bottomed flask equipped with a condenser, thermometer and mechanical stirrer 84.853 parts of water, 0.253 parts of sodium bicarbonate, and 1.786 parts of a 30 wt-% solution of sodium lauryl sulphate in water are added and this mixture is heated to 50° C. At 50° C., 10% of a first monomer feed consisting of 20.93 parts of water, 4.285 of a 30 wt-% solution of sodium lauryl sulphate in water, 0.726 parts of sodium bicarbonate, 0.246 parts of ammonium persulphate, 1.340 parts of methacrylic acid, 14.044 parts of butyl methacrylate, 32.160 parts of dimethyl itaconate and 6.063 parts of methyl methacrylate is added and the reactor contents are heated to 90° C. After the reaction temperature has been reached, the reactor contents are stirred for 15 minutes.

Next, the remainder (i.e. the 90% not added initially) of the first monomer feed is added over a period of 210 minutes. When the feed is completed, the feed tank is rinsed with 1.885 parts of water.

The batch is kept at 90° C. for 30 minutes and cooled the batch to 70° C. Next, a slurry comprising 0.289 parts of a 70 wt-% solution of t-butyl hydroperoxide in water and 1.228 parts of water is added and the batch is stirred for 5 minutes.

Next, a second monomer feed, comprising 2.681 parts of methacrylic acid, 4.932 parts of methyl methacrylate, 15.117 parts of butyl acrylate, and 30.877 parts of butyl methacrylate is added over a period of 240 minutes. Simultaneously, a catalyst feed comprising 11.943 parts of water, 0.120 parts of i-ascorbic acid, and 1.071 parts of a 30 wt-% solution of sodium lauryl sulphate, is fed over the same period. After the second monomer feed is finished, the feed tank is rinsed with 1.885 parts of water.

reactor contents are stirred at 70° C. for another 30 minutes, after which the batch is cooled to 30° C. The pH of the emulsion is adjusted to 7 using 0.6 parts of a 25% solution of ammonia in water or part of it. Simultaneously, 0.623 parts of water are added. The solids content of the emulsion is adjusted to 45% using water.

The resulting emulsion has a solids content of 45%, and a pH of 7.1.

EXAMPLE 4

To a round-bottomed flask equipped with a condenser, thermometer and mechanical stirrer 84.853 parts of water, 0.253 parts of sodium bicarbonate, and 1.786 parts of a 30 wt-% solution of sodium lauryl sulphate in water are added and this mixture is heated to 50° C. At 50° C., 10% of a first monomer feed consisting of 20.93 parts of water, 4.285 of a 30 wt-% solution of sodium lauryl sulphate in water, 0.726 parts of sodium bicarbonate, 0.246 parts of ammonium persulphate, 1.340 parts of methacrylic acid, 14.044 parts of butyl methacrylate, 26.803 parts of diethyl itaconate, and 11.420 parts of methyl methacrylate is added and the reactor contents are heated to 90° C. After the reaction temperature has been reached, the reactor contents are stirred for 15 minutes.

Next, the remainder of the first monomer feed is added over a period of 210 minutes. When the feed is completed, the feed tank is rinsed with 1.885 parts of water.

The batch is kept at 90° C. for 30 minutes and cooled the batch to 70° C. Next, a slurry comprising 0.289 parts of a 70 wt-% solution of t-butyl hydroperoxide in water and 1.228 parts of water is added and the batch is stirred for 5 minutes.

Next, a second monomer feed, comprising 2.681 parts of methacrylic acid, 4.932 parts of methyl methacrylate, 15.117 parts of butyl acrylate, 13.402 parts of monobutyl itaconate, and 17.475 parts of butyl methacrylate is added over a period of 240 minutes. Simultaneously, a catalyst feed comprising 11.943 parts of water, 0.120 parts of i-ascorbic acid, and 1.071 parts of a 30 wt-% solution of sodium lauryl sulphate, is fed over the same period. After the second monomer feed is finished, the feed tank is rinsed with 1.885 parts of water.

The reactor contents are stirred at 70° C. for another 30 minutes, after which the batch is cooled to 30° C. The pH of the emulsion is adjusted to 7 using 0.6 parts of a 25% solution of ammonia in water or part of it. Simultaneously, 0.623 parts of water are added. The solids content of the emulsion is adjusted to 45% using water.

The resulting emulsion has a solids content of 45%, and a pH of 7.2.

EXAMPLE 5

To a round-bottomed flask equipped with a condenser, thermometer and mechanical stirrer 84.853 parts of water, 0.253 parts of sodium bicarbonate, and 1.786 parts of a 30 wt-% solution of sodium lauryl sulphate in water are added and this mixture is heated to 50° C. At 50° C., 10% of a first monomer feed consisting of 20.93 parts of water, 4.285 of a 30 wt-% solution of sodium lauryl sulphate in water, 0.726 parts of sodium bicarbonate, 0.246 parts of ammonium persulphate, 1.340 parts of methacrylic acid, 14.044 parts of butyl methacrylate, and 38.223 parts of dimethyl itaconate is added and the reactor contents are heated to 90° C. After the reaction temperature has been reached, the reactor contents are stirred for 15 minutes.

Next, the remainder of the first monomer feed is added over a period of 210 minutes. When the feed is completed, the feed tank is rinsed with 1.885 parts of water.

The batch is kept at 90° C. for 30 minutes and cooled the batch to 70° C. Next, a slurry comprising 0.289 parts of a 70 wt-% solution of t-butyl hydroperoxide in water and 1.228 parts of water is added and the batch is stirred for 5 minutes. Next, a second monomer feed, comprising 2.681 parts of methacrylic acid, 4.932 parts of methyl methacrylate, 2.673 parts of diacetone acryl amide, 12.444 parts of butyl acrylate, and 30.877 parts of butyl methacrylate is added over a period of 240 minutes. Simultaneously, a catalyst feed comprising 11.943 parts of water, 0.120 parts of i-ascorbic acid, and 1.071 parts of a 30 wt-% solution of sodium lauryl sulphate, is fed over the same period. After the second monomer feed is finished, the feed tank is rinsed with 1.885 parts of water.

The reactor contents are stirred at 70° C. for another 30 minutes, after which the batch is cooled to 30° C. The pH of the emulsion is adjusted to 8 using 0.6 parts of a 25% solution of ammonia in water or part of it. Simultaneously, 0.623 parts of water are added. The solids content of the emulsion is adjusted to 45% using water.

The resulting emulsion has a solids content of 45%, and a pH of 8.0.

The invention claimed is:

1. An aqueous polymer dispersion having a minimum film forming temperature below 50° C. comprising a vinyl polymer derived from olefinically unsaturated monomers, with at least two phases comprising:
   A) 40 to 90 wt % of a vinyl polymer A having a glass transition temperature in the range of from −50 to 30° C.; and
   B) 10 to 60 wt % of a vinyl polymer B having a glass transition temperature the range of from 50 to 130 ° C.; wherein
   at least 10% by weight of a total amount of monomer used to form the vinyl polymer A and the vinyl polymer B is derived from at least one bio-renewable olefinically unsaturated monomer that imparts a carbon-14 content to the vinyl polymer A and/or the vinyl polymer B of at least about 1.5 dpm/gC of carbon-14; and wherein
   the weight percentage of monomers in the vinyl polymer A and the vinyl polymer B are calculated based on a total amount of olefinically unsaturated monomers used to prepare the vinyl polymer A and the vinyl polymer B being 100%; and wherein
   the vinyl polymer A comprises 0.1 to 10 wt % of at least one acid-functional olefinically unsaturated monomer where the weight percentage of the at least one acid-functional monomer is calculated based on a total amount of the olefinically unsaturated monomer used to prepare the vinyl polymer A being 100%.

2. The aqueous polymer dispersion according to claim 1, wherein said acid-functional olefinically unsaturated monomer is selected from the group consisting of acrylic acid, methacrylic acid, itaconic anhydride, methylene malonic acid, itaconic acid, crotonic acid and fumaric acid.

3. The aqueous polymer dispersion according to claim 1 wherein the vinyl polymer A comprises 0.1 to 20 wt % of at least one crosslinking olefinically unsaturated monomer.

4. The aqueous polymer dispersion according to claim 1, wherein the vinyl polymer A comprises 0.4 to 6 wt % of at least one olefinically unsaturated monomer with a wet-adhesion promoting functionality .

5. The aqueous polymer dispersion according to claim 4, wherein the olefinically unsaturated monomer with a wet-adhesion promoting functionality contains a wet-adhesion promoting functional group which is at least one selected from the group consisting of acetoacetoxy groups, optionally substituted amine groups and optionally substituted urea groups.

6. The aqueous polymer dispersion according to claim 1, wherein the bio-renewable olefinically unsaturated monomers are bio-renewable (meth)acrylic acid and or bio-renewable alkyl (meth)methacrylate.

7. The aqueous polymer dispersion according to claim 1, wherein the bio-renewable olefinically unsaturated monomers are selected from the group consisting of α-methylene butyrolactone, α-methylene valerolactone, α-methylene γ-R1 butyrolactone where R1 can be an optionally substituted alkyl or optionally substituted aryl; dialkyl itaconates; monoalkyl itaconates, itaconic acid, itaconic anhydride, crotonic acid and alkyl esters thereof, citraconic acid and alkyl esters thereof, methylene malonic acid and its mono and dialkyl esters, citraconic anhydride, and mesaconic acid and alkyl esters thereof.

8. The aqueous polymer dispersion according to claim 1, wherein the bio-renewable monomers are selected from the group consisting of bio-renewable: N—R2, α-methylene butyrolactam where R2 can be an optionally substituted alkyl or optionally substituted aryl); N—R2, α-methylene γ-R1 butyrolactam; N-alkyl itaconimids; itaconmonoamids; itacondiamidsialkyl itaconamides, mono alkyl itaconamides; furfuryl (meth)acrylate; and fatty acid functional (meth)acrylates.

9. The aqueous polymer dispersion according to claim 5, wherein the olefinically unsaturated monomer with a wet-adhesion promoting functionality contains a wet-adhesion promoting functional group which is at least one selected from the group consisting of cyclic ureido groups, imidazole groups, pyridine groups, hydrazine and semicarbazide groups.

10. The aqueous polymer dispersion according to claim 1, wherein at least 20 wt % of the total amount of monomer used to form the vinyl polymer A and the vinyl polymer B is derived from the at least one bio-renewable olefinically unsaturated monomer.

11. The aqueous polymer dispersion according to claim 1, wherein the vinyl polymer A comprises 0.1 to 5 wt. % of the at least one acid functional olefinically unsaturated monomer.

12. A process for preparing the aqueous polymer dispersion according to claim 1 which process comprises the steps of:
   a) a first polymerization step, to form a first phase vinyl polymer;
   b) a second polymerization step in the presence of the resulting first phase vinyl polymer from step a) to form a second phase vinyl polymer.

13. A film, polish, varnish, lacquer, paint, ink or adhesive comprising an aqueous polymer dispersion according to claim 1.

14. A coated substrate which comprises a substrate and a protective coating comprising the aqueous polymer dispersion according to claim 1 on a surface of the substrate.

15. The coated substrate according to claim 14, wherein the substrate is a substrate formed of wood, plastic, paper or metal.

* * * * *